Sept. 28, 1954     E. STANSFIELD     2,690,322
TAP, VALVE OR THE LIKE
Filed Nov. 21, 1950

INVENTOR:
EDGAR STANSFIELD
BY:

Patented Sept. 28, 1954

2,690,322

UNITED STATES PATENT OFFICE 2,690,322

TAP, VALVE OR THE LIKE

Edgar Stansfield, Manchester, England

Application November 21, 1950, Serial No. 196,730

Claims priority, application Great Britain
November 22, 1949

4 Claims. (Cl. 251—324)

The present invention relates to taps, valves and the like device for controlling liquid flow, (hereinafter referred to as taps) and relates particularly to that variety of tap in which a piston or plug carrying a sealing washer is movable into and out of a cylindrical sealing bore to permit or obstruct the passage of liquid through the tap.

One problem arising with taps of this kind is the occurrence of water hammer and in certain circumstances such taps tend to be very noisy, it being impossible to determine beforehand whether any particular tap will or will not give rise to water hammer when connected into a piping system operating at a particular pressure.

It is an object of the present invention to produce a tap which will not give rise to water hammer and we have not yet discovered conditions within the ordinary range of operating conditions usual in domestic water supply systems in which a tap constructed in accordance with the present invention will give rise to water hammer.

In taps of the kind referred to it has already been proposed to provide the plug with a sealing ring or washer positioned with some lateral freedom in a parallel-sided annular groove in the plug, the plug being retractable from the cylindrical sealing bore into a portion of greater diameter to permit liquid to flow through the sealing bore of the tap, the boundary line between the sealing bore and the portion of greater diameter being substantially level all round the periphery of the bore.

In this general type of construction it is believed that the incidence of water hammer is occasioned by reason of the lateral freedom of movement of the sealing ring in its groove.

At the point where the tap is nearly closed there is a tendency for the sealing ring to be moved up and down in its groove by the water flow and the variable flow thus produced may set up an oscillation of a definite periodicity giving rise to the undesirable effect known as water hammer.

The theory underlying the present invention is that the sealing should not be effected simultaneously all round the plug, as in the known constructions. If the ring is brought into sealing contact with the bore of the tap in stages, then there will be a very gradually decreasing flow opening for the last stages of the closure compared with the relatively rapid shut-off occurring in the known constructions, where the sealing ring comes into sealing contact with a bore whose entry is parallel with it and is therefore contacted simultaneously around the whole periphery of the ring.

According to the present invention a tap of the kind which is controlled by means of a ring of circular cross section, arranged with lateral clearance in a groove in a longitudinally movable plug and movable into and out of sealing relation with a sealing portion of the tap bore from and to a larger portion communicating with the water inlet is characterised in that the parts are so arranged that the sealing ring does not come into sealing contact with the sealing portion simultaneously around its whole periphery.

In a preferred form of the invention the piston is formed with an annular groove, the edge of the groove nearer the sealing bore being formed with a raised portion, extending towards the other edge of the groove, sufficient space being left between said raised portion and the other edge of the groove to allow a resilient sealing ring of circular cross section to be fitted with a certain amount of lateral clearance. The construction operates equally satisfactorily with two or more raised portions on the edge of the groove nearer the sealing bore. The raised portion holds a part of the sealing ring away from the bottom edge of the groove, whilst the unsupported part of the ring is pushed towards it by the water flow at least during the closing operation before the complete shut-off is effected. This allows water to flow between the ring and the edge of the sealing bore close to the raised portion, whilst the unsupported part of the sealing ring is already in contact with the entry of the sealing portion of the bore.

In order that the invention may be more clearly understood one form of the invention is hereinafter described with reference to the accompanying drawings wherein.

Figures 1, 2, 3:
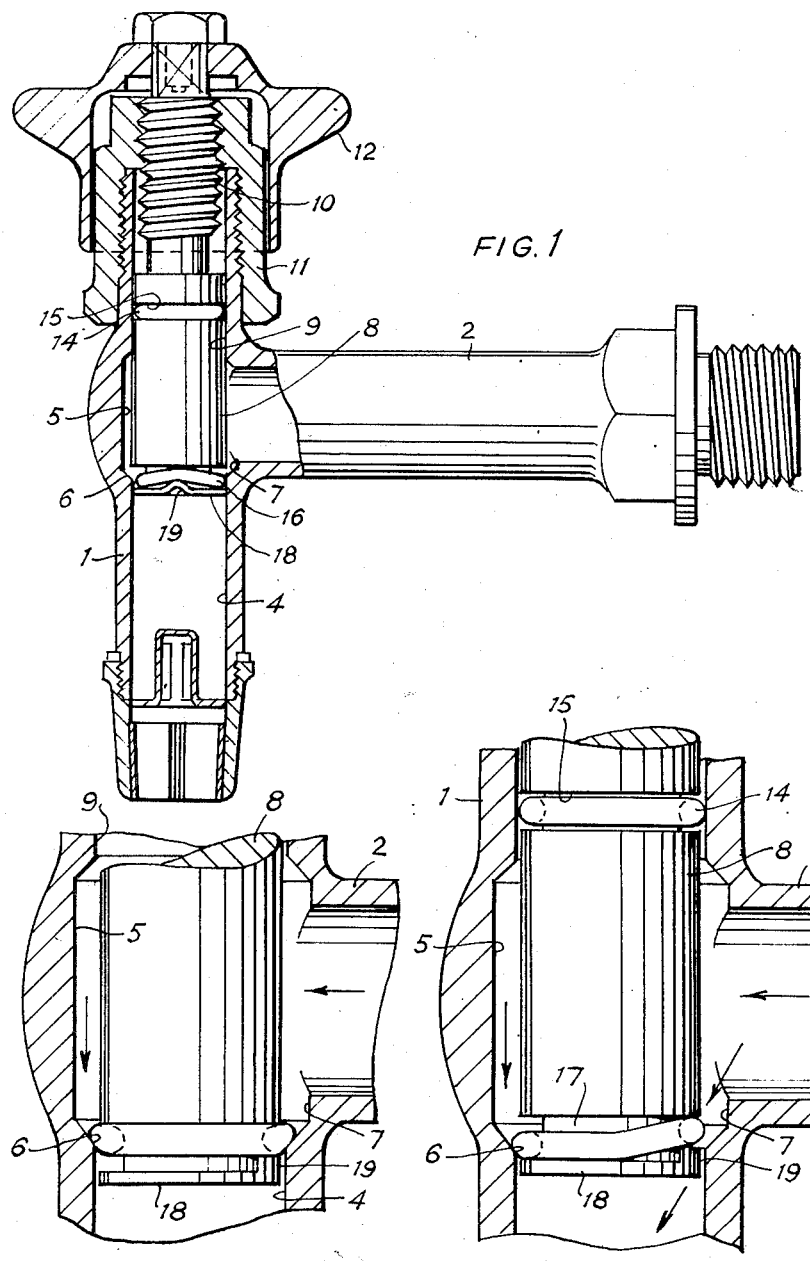
Fig. 1 is a section of one form of tap.
Fig. 2 and Fig. 3 are enlarged diagrammatic sections showing the sealing ring in the partially sealed and completely sealed positions respectively.

A tap is formed with a T-shaped body 1, the end of the stem 2 which forms the inlet being screw-threaded exteriorly for connection to supply piping by means of a conventional socket coupling. The head of the T-shaped body, which will normally be vertical, has a straight-through, parallel sided bore 4, with an enlarged portion 5 at the centre of its length, into which the incoming water enters from the stem 2, when in use. The enlarged portion 5 is separated from the sealing portion 6 of the bore by a definite step 7 inclined at an angle of approximately 45°.

Within the bore is a plug 8, only slightly less in diameter than the sealing portion 6, so as to be an easy sliding fit therein and likewise in the upper portion 9 of the bore, which is the same diameter as the sealing portion 6. The top end of the plug is screw-threaded at 10 for engagement with a corresponding formation formed in a cap 11 which is itself screwed on to the outside of the body, so that rotation of the plug 8 by means of the handle 12 will cause progression of the plug along the bore of the tap. The lower part of the plug is formed with two grooves, each carrying sealing rings of circular cross section. The upper ring 14 moves only within the upper portion 9 of the bore to maintain it in a permanently sealed condition and its groove 15 is an annular groove formed with a substantially cylindrical bottom and having upper and lower edges substantially normal thereto and being of such width as to allow the ring 14 to have a certain amount of lateral clearance.

The lower ring 16, which is identical with the ring 14, is movable into and out of sealing relation with the sealing portion 6 of the bore from and to the enlarged portion 5. This lower ring, which is the one effective to open and close the tap, is carried in an annular groove 17 having a substantially cylindrical bottom surface and having a plain upper edge.

The lower edge of the groove is cut very close to the bottom of the plug so as to leave only a very thin wall 18 of metal bounding the bottom of the groove. The wall 18 is dented from the underside to deform the same and to form a small hump or projection 19 on the groove side of the wall.

The groove 17 is preferably proportioned so that the width of the groove is approximately 1.75 times the cross section diameter of the sealing ring, whilst the depth of the groove is just less than such diameter, so that the distance between the bottom of the groove and the wall of the sealing bore is such as to allow the ring to be interposed between the same without substantial deformation. The hump 19 should extend upwardly into the groove for a distance of about half the cross section diameter of the sealing ring, thus leaving a degree of lateral clearance to the ring between the top of the hump and the upper edge of the groove.

Conditions under which water hammer occurs in a construction such as has been described, have not yet been found.

The mode of operation is explained with reference to Figs. 2 and 3 and no other explanation for the success of the construction than as follows has yet been found.

The ring 16 which is made of readily deformable synthetic rubber material slides quite easily on the bottom of its groove. As the plug is moved down toward the sealing bore, the water forces the sealing ring down to the lower end of the groove, so that it is in the position shown in Fig. 2. The left hand side of the ring, as shown, comes into contact with the top edge of the sealing bore whilst a small portion at the right hand edge is held away by the hump, allowing a partial flow to continue through an aperture of gradually decreasing size. The left hand edge of the ring is held in sealing relation at the entry of the bore without further downward movement until the plug brings the ring into the position shown in Fig. 3, when a complete shut-off of the water flow takes place, and the ring can be moved further into the bore by further plug movement. In this position the water pressure deforms the ring so that it presses more tightly against the wall of the sealing portion.

The use of an effective aperture at one side of the plug and the distortion of the sealing ring seems to avoid the occurrence of the oscillatory condition which gives rise to water hammer.

An alternative possibility which may be used additionally to or to replace the groove with the distorted lower edge above described is to cut away a portion of the step separating the sealing portion of the bore from the enlarged portion. This can be easily effected by means of a tool inserted through the hollow stem of the T, the portion being cut out of the bore wall directly opposite to the opening of the stem.

What I claim is:

1. For use with a tap bore having an outlet portion and a larger diameter inlet portion for admission of a fluid, a valve closure arrangement comprising, in combination, a plug front end portion formed with a circumferential annular groove having opposite annular front and rear faces spaced in axial direction from each other, said plug front end portion being movable in the tap bore between an advanced sealing position in which said groove is entirely located in said outlet portion of the tap bore, an intermediate position in which said front face of said groove is located in said outlet portion and said rear face is located in said larger diameter inlet portion of the tap bore, and a retracted opening position in which said groove is entirely located in said larger diameter inlet portion; a sealing ring located in said groove and having an axial extension smaller than the axial distance between said rear and front faces of said groove; and a confining means located in said groove projecting from said front face towards said rear face over a minor portion of the circumference of said groove and reducing the axial extension of a portion of said groove for holding, together with the water pressure acting on said sealing ring, said sealing ring in said intermediate position of said plug front end portion in an oblique position within said groove, partly located in said larger diameter portion engaging said rear face and partly located in said outlet portion in contact therewith, said sealing ring permitting in such oblique position limited fluid communication between said larger diameter portion and said outlet portion of said tap bore for preventing oscillation of said sealing ring while said plug front end portion is in said intermediate position thereof.

2. For use with a cylindrical tap bore having an outlet portion and a larger diameter inlet portion for admission of a fluid, a valve closure arrangement comprising, in combination, a cylindrical plug front end portion formed with a circumferential annular groove having opposite annular front and rear faces spaced in axial direction from each other, said plug front end portion being movable in the tap bore between an advanced sealing position in which said groove is entirely located in said outlet portion of the tap bore, an intermediate position in which said front face of said groove is located in said outlet portion and said rear face is located in said larger diameter inlet portion of the tap bore, and a retracted opening position in which said groove is entirely located in said larger diameter inlet portion; a sealing ring located in said groove and having an axial extension smaller than the axial distance between said rear and front faces of said groove; and a confining projection located in said groove projecting from said front face towards said rear face over a minor portion of the circumference of said groove and reducing the axial extension of a portion of said groove for holding, together with the water pressure acting on said sealing ring, said sealing ring in said intermediate position of said plug front end portion in an oblique position within said groove, partly located in said larger diameter portion engaging said rear face and partly located in said outlet portion in contact therewith, said sealing ring permitting in such oblique position limited fluid communication between said larger diameter portion and said outlet portion of said tap bore for preventing oscillation of said sealing ring while said plug front end portion is in said intermediate position thereof.

3. In a valve including a valve body, and a movable closure plug, in combination, a valve body portion formed with a cylindrical tap bore having an outlet portion and a larger diameter inlet portion for admission of a fluid; a cylindrical plug front end portion formed with a circumferential annular groove having opposite annular front and rear faces spaced in axial direction from each other, said plug front end portion being movable in the tap bore between an advanced sealing position in which said groove is entirely located in said outlet portion of the tap bore, an intermediate position in which said front face of said groove is located in said outlet portion and said rear face is located in said larger diameter inlet portion of the tap bore, and a retracted opening position in which said groove is entirely located in said larger diameter inlet portion; a sealing ring of circular cross section located in said groove and having an axial extension smaller than the axial distance between said rear and front faces of said groove, said sealing ring having an outer diameter larger than the diameter of said outlet portion and smaller than the diameter of said larger diameter inlet portion; and a confining means located in said groove projecting from said front face towards said rear face over a minor portion of the circumference of said groove and reducing the axial extension of a portion of said groove for holding, together with the water pressure acting on said sealing ring, said sealing ring in said intermediate position of said plug front end portion in an oblique position within said groove, partly located in said larger diameter portion engaging said rear face and partly located in said outlet portion in contact therewith, said sealing ring permitting in such oblique position limited fluid communication between said larger diameter portion and said outlet portion of said tap bore for preventing oscillation of said sealing ring while said plug front end portion is in said intermediate position thereof.

4. For use with a tap bore having an outlet portion and a larger diameter inlet portion for admission of a fluid, a valve closure arrangement comprising, in combination, a plug front end portion formed with a circumferential annular groove having opposite annular front and rear faces spaced in axial direction from each other, said plug front end portion being movable in the tap bore between an advanced sealing position in which said groove is entirely located in said outlet portion of the tap bore, an intermediate position in which said front face of said groove is located in said outlet portion and said rear face is located in said larger diameter inlet portion of the tap bore, and a retracted opening position in which said groove is entirely located in said larger diameter inlet portion; a sealing ring located in said groove and having an axial extension smaller than the axial distance between said rear and front faces of said groove; and means associated with said groove for holding, together with the water pressure acting on said sealing ring, said sealing ring in said intermediate position of said plug front end portion in an oblique position within said groove, partly located in said larger diameter portion away from said outlet portion of the tap bore and partly located in said outlet portion in contact therewith, said sealing ring permitting in such oblique position limited fluid communication between said larger diameter portion and said outlet portion of said tap bore for preventing oscillation of said sealing ring while said plug front end portion is in said intermediate position thereof.

References Cited in the file of this patent

UNITED STATES PATENTS

| Number | Name | Date |
| --- | --- | --- |
| 157,800 | Demarest | Dec. 15, 1874 |
| 2,360,733 | Smith | Oct. 17, 1945 |
| 2,369,008 | Beecher | Feb. 6, 1945 |
| 2,538,133 | Tratizik | Jan. 16, 1951 |

FOREIGN PATENTS

| Number | Country | Date |
| --- | --- | --- |
| 40,549 | Germany | 1887 |